Nov. 29, 1955  J. E. CHAGNON  2,724,876
WEATHER STRIP
Filed Feb. 21, 1952
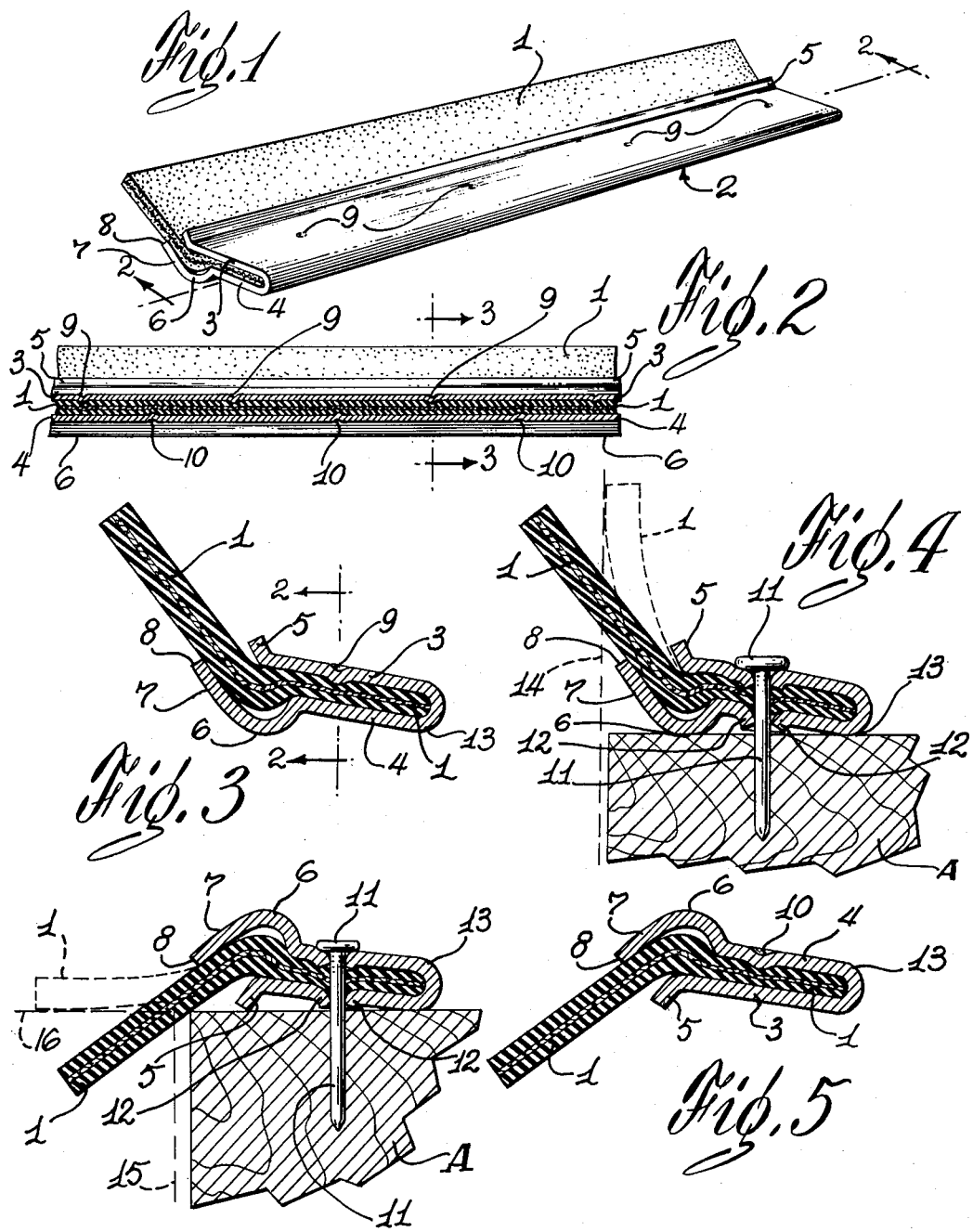
Inventor
Joseph Edouard Chagnon
Attorneys United States Patent Office 2,724,876
Patented Nov. 29, 1955

2,724,876
WEATHER STRIP
Joseph Edouard Chagnon, Montreal, Quebec, Canada
Application February 21, 1952, Serial No. 272,835
3 Claims. (Cl. 20—69)

The present invention relates to a weather strip and more particularly to a weather strip adapted to be used in conjunction with doors, windows and similar movable closure elements.

Some of the weather strips used for such a purpose are composed of a resilient strip or band made of rubber or the like material, partly inserted in a rigid supporting strip preferably made of metal, and partly projecting at an angle therefrom.

These weather strips are usually affixed to the edges of the doors, windows and the like movable closures or to the frames enclosing the same, by means of nails and the like which cause extrusion of metal or bulges at the contacting face of said rigid strips thereby allowing air drafts between the same.

Therefore the general object of the present invention is the provision of a weather strip which is so constructed as to overcome the above mentioned defect.

A more particular object of the present invention is the provision of a weather strip adapted to be nailed to a movable closure or to the frame enclosing the same, in which bulges produced by the nails will not cause air drafts between said strip and the surface to which it is nailed.

Yet another important object of the present invention is the provision of a weather strip which may be disposed on either one of its sides, depending on the purpose to which it is put to use, and yet will be as efficient in one position as in the other.

Yet another important object of the present invention is the provision of a weather strip in which the supporting metal strip will contact the surface to which it is secured along two lines extending on both sides of the securing means.

Yet another important object of the present invention is the provision of a weather strip made of a resilient strip partly inserted into a rigid supporting strip, said resilient strip being adapted to bend over a substantial radius of curvature thereby minimizing the possibility of cutting of said resilient strip.

Another important object of the present invention is the provision of a weather strip of the character described which is simple and inexpensive to manufacture and which is easy to install.

The foregoing and other important objects of the present invention will become more apparent during the following disclosure and by referring to the drawings in which:

Figure 1 is a perspective view of the weather strip according to the invention.

Figure 2 is a longitudinal section along line 2—2 of Figure 1;

Figure 3 is an enlarged cross-section taken along line 3—3 of Figure 2;

Figure 4 is a cross-section similar to that of Figure 3 showing the weather strip in secured position;

Figure 5 is an enlarged cross-section of the weather strip taken across a punch mark made on one of the main legs of the supporting metal strip; and Figure 6 is a cross-section similar to that of Figure 5 showing the weather strip in secured position.

Referring now more particularly to the drawings in which like reference characters indicate like elements throughout, the weather strip, according to the invention, is constituted by two main elements, namely a resilient elongated flat strip 1 made of rubber or the like and a supporting protecting rigid strip 2 preferably made of metal and longitudinally folded over itself to have a U-shaped cross-section and to provide a cross-piece from which extend two legs 3 and 4, respectively. The leg is bent outwardly at its free end to form a longitudinal offset lip 5 extending at an angle relatively to the remainder of leg 3.

The leg 4 of the metal strip 2 is curved outwardly to form a rounded offset projection 6 which is extended to constitute an inwardly disposed lip 7, the free edge 8 of which projects inwardly of the inner face of the leg 4 and lies substantially along the middle axis of the U-shaped supporting strip 2.

The lips 5 and 7 of the legs 3 and 4 respectively are slightly flared relatively to one another and their spacing is substantially greater than the thickness of the resilient strip or element 1 whereby the latter is free to move to a certain extent between said lips 5 and 7. Normally strip element 1 is in contact with lip-shaped leg part 7 and is movable from the latter toward lip-shaped leg part 5 upon contact of element 1 with an abutment, such as a door 14 (Fig. 4).

The rigid metal strip 2 is further provided with suitably spaced punch marks 9 and 10 respectively on the legs 3 and 4 for easier nailing. These punch marks 9 and 10 are staggered so that the nails 11 will not abut and be deviated by the bulge made by said punch marks at the inner face of the legs 3 and 4.

It will be noted that the outer portion of the resilient strip 1 will lie at an angle relatively to the inner portion of said resilient strip 1 because it abuts the inwardly projecting lip 7.

When the weather strip, according to the invention, is nailed to a door, window or a frame in the position shown in Figure 4, the outwardly bent metal portion 12 surrounding the nail 11 at the outer face of the leg 4 will not be pressed against the surface of the member A because said leg 4 only contacts said member along its inner end portion 13 located adjacent the cross-piece of U-shaped strip 2 and along the outer projection 6 located adjacent lip-shaped part 7.

When the weather strip, according to the invention, is secured to a member in the position shown in Figure 6 with the leg 3 adjacent the surface of said member A, the strip will again contact the latter along two spaced apart contact lines disposed on both sides of the nails 11 namely at the outer edge or protuberant part of the lip 5 and the inner end or protuberant part of said leg 3 located adjacent the cross-piece of strip 2. In this case also, the bulge 12 made around the nails 11 caused by the piercing of the leg 3 will not cause improper contact of the metal strip 2 with the surface of the member A.

Because there is a certain play between the lips 5 and 7 for the resilient strip 1, the latter may bend over a substantial radius of curvature thereby preventing its premature cutting.

The weather strip, according to the invention, will be preferably disposed, as shown in Figure 4, when nailed on a frame adapted to abut the free edges of a door, said door taking the position shown in dotted lines at 14 when in closed position.

The position of the weather strip shown in Figure 6 may be preferred when said weather strip is secured to the frame member to which the door is hinged, said door being shown in dotted lines at 15 when in opened position and at 16 when in closed position.

It can thus be seen that there has been provided according to this invention a weather strip structure having a projecting resilient element for contact with an abutment comprising a U-shaped support strip having a cross-piece and two legs extending therefrom for retaining one portion of said element, each leg including spaced, linear contact locations forming respective protuberant parts for abutting the respective leg in applied condition against a surface cooperable with said abutment, to thereby attain air spaces defined by the respective leg, its locations and said surface, both said legs terminating into lip-shaped parts offset with respect to the remaining parts of said legs and being spaced a sufficient distance from each other which is greater than the thickness of said element, so that another portion of said element located adjacent said lip-shaped parts normally contacts one of said lip-shaped parts and may move from the latter toward the other of said lip-shaped parts when establishing contact of said element with said abutment, and spaced punch marks disposed on each leg and arranged intermediate said locations thereof.

While a preferred embodiment according to the present invention has been illustrated and described, it is understood that various modifications may be resorted to without departing from the spirit and scope of the appended claims.

What I claim is:

1. A weather strip structure having a projecting resilient element for contact with an abutment comprising a U-shaped support strip having a cross-piece and two legs extending therefrom for retaining one portion of said element, each leg including spaced, linear contact locations forming respective protuberant parts for abutting the respective leg in applied condition against a surface cooperable with said abutment, to thereby attain air spaces defined by their respective leg, its locations and said surface, both said legs terminating into lip-shaped parts offset with respect to the remaining parts of said legs and being spaced a sufficient distance from each other which is greater than the thickness of said element, so that another portion of said element located adjacent said lip-shaped parts normally contacts one of said lip-shaped parts and may move from the latter toward the other of said lip-shaped parts when establishing contact of said element with said abutment, and spaced punch marks disposed on each leg and arranged intermediate said locations thereof.

2. A structure according to claim 1, one of said locations of each leg being arranged adjacent the cross-piece of said U-shaped support strip, the other locations of said legs being disposed adjacent said offset lip-shaped parts thereof.

3. A structure according to claim 1, wherein the spaced punch marks on one of said legs are arranged in staggered relation to those disposed on the other leg.

References Cited in the file of this patent

UNITED STATES PATENTS

| | | |
|---|---|---|
| 1,270,151 | Harnly | June 18, 1918 |
| 1,728,120 | Greene | Sept. 10, 1929 |
| 1,834,031 | Macklanburg | Dec. 1, 1931 |
| 1,877,448 | Fitzgerald | Sept. 13, 1932 |
| 2,035,862 | Calcutt | Mar. 31, 1936 |
| 2,528,264 | Cappock et al. | Oct. 31, 1950 |

FOREIGN PATENTS

| | | |
|---|---|---|
| 131,382 | Austria | Jan. 25, 1933 |